No. 722,532. PATENTED MAR. 10, 1903.
A. L. McMURTRY.
SPEED INDICATOR FOR VEHICLES.
APPLICATION FILED OCT. 3, 1902.
NO MODEL.

Witnesses:
L. F. Browning
W. A. Stahlin

Inventor:
Alden L. McMurtry
by his Attorneys
Baldwin, Davidson & Wight

UNITED STATES PATENT OFFICE.

ALDEN L. McMURTRY, OF NEW YORK, N. Y.

SPEED-INDICATOR FOR VEHICLES.

SPECIFICATION forming part of Letters Patent No. 722,532, dated March 10, 1903.

Application filed October 3, 1902. Serial No. 125,814. (No model.)

*To all whom it may concern:*

Be it known that I, ALDEN L. MCMURTRY, a citizen of the United States, residing in the city, county, and State of New York, have invented an Improved Speed-Indicator for Vehicles, of which the following is a specification.

This device is particularly designed for automobiles, but is applicable to vehicles of other character. It comprises an organization wherein a member or toothed wheel is advanced step by step, preferably one step for each revolution of a wheel of the vehicle, and is so related in its movement to the circumference or tread of the vehicle-wheel that by the aid of an indicating device associated therewith and which may be in the form of a pointer traveling around a dial a given distance traversed will be indicated to the view of the occupant of the vehicle, and associated with these devices is a stop-watch or timepiece automatically actuated to indicate the time occupied in traversing such definite distance and automatically restored to zero. If, for instance, the time is to be taken for a mile, the arrangement is such that at the start the stop-watch is thrown into operation and at the finish is arrested, these operations occurring while the pointer is traversing a certain part of the dial—for instance, one-half thereof. Thereafter and before the pointer has again reached the starting-point the stop-watch may be automatically returned to zero, and the watch being again started the time occupied in traversing the third mile will be indicated. For many reasons it is preferable that the parts of this device should be actuated or controlled electrically.

The accompanying drawings show one embodiment of the invention which experience has demonstrated to be practical and efficient.

Figure 1:
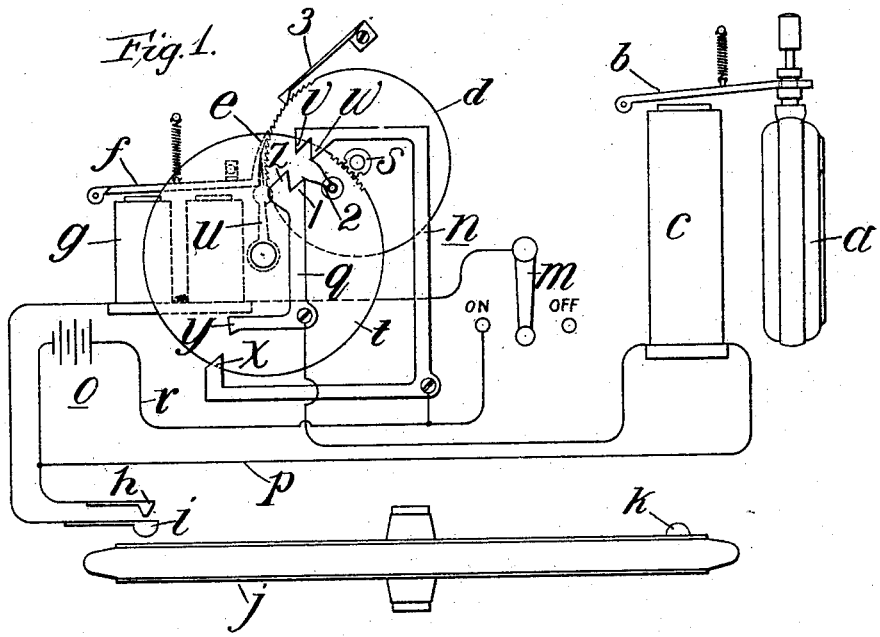
Figure 2:
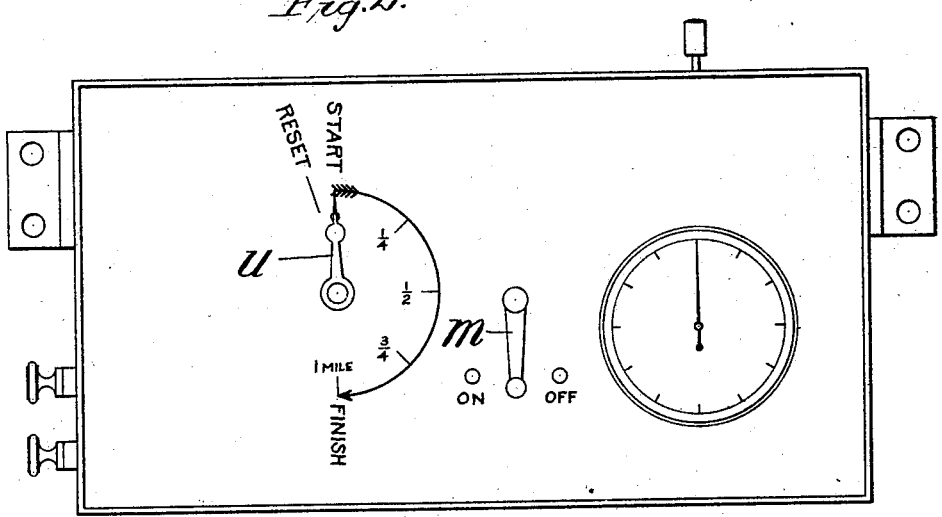

Figure 1 is a diagrammatic view illustrating the organization and operation of the apparatus, and Fig. 2 a front elevation of a case within which the working parts are contained and which may be suitably secured in position in the vehicle.

$a$ is a stop-watch of ordinary construction controlled by the armature-lever $b$ of an electromagnet $c$ and both of which in the special form of the device I have elected to illustrate are contained in the same case with other parts of the apparatus.

$d$ is a toothed wheel advanced step by step by the hook or pawl $e$ on the armature-lever $f$ of an electromagnet $g$. The terminal contacts $h$ $i$ of the circuit may be closed once in each revolution of the driving-wheel $j$ by a boss, projection, or inclined face $k$ thereon, which presses $i$ into contact with $h$. The circuit connections may be as follows: From contact $i$ the circuit passes through the winding of magnet $g$, thence to the heel or pivot of a two-point switch $m$, and thence to a contact-frame $n$ and battery $o$. The other terminal contact $h$ is connected with the opposite pole of the battery $m$ and by wire $p$ through the winding of magnet $c$ and thence to contact-frame $q$. Since, as shown, the instrument is adapted to time distances up to one mile, I prefer to attach to the shaft of wheel $d$ a pinion $s$, driving a wheel $t$, on the axis of which is a pointer $u$, located outside the face-plate of the apparatus and traversing a dial, as shown in Fig. 2. As appears from this figure, the face of the stop-watch is exposed at the front plate of the instrument, outside of which is also mounted the switch $m$.

The contact-frame $n$ has radially disposed with reference to the axis of wheel $t$ two contact projections $v$ $w$ and diametrically opposite these a third contact projection $x$. The contact frame or piece $q$ has a contact projection $y$ opposite the projection $x$ and two contact projections $z$ and 1, respectively, opposite the projections $v$ $w$.

2 is an insulated bifurcated contact-piece carried by a pin projecting from the side of wheel $t$ and acting as the wheel is rotated to successively electrically connect the pins of contact projections $x$ $y$ $v$ $z$ $w$ 1.

Of course the particular arrangement or form of the various contact devices, arrangement of circuits, and mechanical details of construction and organization are quite immaterial, as they are susceptible of great variation.

The operation is as follows: The switch $m$ being closed and the vehicle in motion, the wheel $d$ will be advanced one tooth each time that the magnet $g$ is energized by closure of contacts $h$ $i$, and the pointer $u$ will traverse around the dial in the direction indicated by the arrow. When the pointer is at "Start" and the contact projections $w\,1$ are bridged by the contact 2, magnets $g$ and $c$ will both be energized, and the latter attracting its armature-lever presses in the spindle or post of the stop-watch to start it into operation. As contact 2 passes from contacts $w$ and 1 the armature-lever $b$ will rise under the tension of its spring, carrying with it or assisting the rise of the spindle of the watch, and thereafter the magnet $c$ will be inactive until the pointer has reached the division marked "Finish" on the dial, when the contact 2 bridges contacts $xy$, again completing the circuit of magnet $c$, whose armature depresses the spindle of the watch and arrests its movement, the watch then indicating the time during which the pointer has passed from "Start" to "Finish" on the dial, which occurs, as indicated in the drawings, during the time the vehicle has traversed one mile. While the pointer is moving from "Finish" to the point on the dial marked "Reset," the watch indicates the time during which the preceding mile was run. When the pointer reaches the point "Reset," contact 2 bridges contacts $vz$, thereby completing the circuit of magnet $c$ and causing its armature to depress the spindle of the watch to return it to zero. This operation may be repeated indefinitely as long as the vehicle is in motion and the switch $m$ closed. When the apparatus is organized as shown in the accompanying drawings, the time of running alternate miles will be indicated by the watch. The stop-watch is of ordinary construction, and its post or spindle projects above the top of the case, so that it may be wound conveniently or operated by hand, if desired.

3 is an ordinary bank or friction-retention pawl bearing on the toothed wheel $d$.

I claim as my invention—

1. A vehicle speed-indicator comprising the combination of a part actuated relatively to the speed at which the vehicle is traveling, an indicating device associated therewith showing a definite distance traversed, and a stop-watch or timepiece, automatically set into operation and automatically arrested by the speed-indicator-actuating mechanism and having the usual indicating devices and which shows the time occupied in traversing such definite distance.

2. A speed-indicator for vehicles comprising a part actuated relatively to the speed of the vehicle, an indicating device associated therewith showing a definite distance traversed, a stop-watch or timepiece, automatically set into operation and automatically arrested by the speed-indicator-actuating mechanism to indicate the time occupied traveling such distance, and thereafter automatically returned to zero.

3. A speed-indicator for vehicles comprising a wheel rotated step by step controlled by a wheel of the vehicle, a dial and pointer associated therewith and showing a definite distance traversed, a stop-watch or timepiece indicating the time occupied in traversing such distance, and means whereby in the revolution of the indicating device the stop-watch is set into operation at the start of the distance to be timed, arrested at the finish and thereafter returned to zero, the organization being such that this cycle of operations may be automatically repeated during the continued movement of the vehicle.

4. A speed-indicator for vehicles comprising a wheel electromagnetically rotated step by step relatively to the speed of the vehicle, indicating devices associated therewith showing a definite distance traversed by the vehicle, a stop-watch or timepiece, an electromagnet controlling it, a source of electrical energy, and circuit connections whereby, at the start of the distance to be measured the stop-watch is set into operation, arrested at the finish and thereafter returned to zero.

5. A speed-indicator for vehicles comprising a wheel electromagnetically rotated step by step relatively to the speed of the vehicle, indicating devices associated therewith showing a definite distance traversed by the vehicle, a stop-watch or timepiece, an electromagnet controlling it, a source of electrical energy, and circuit connections for said magnet controlled by the movement of the electromagnetically-driven wheel, whereby at the start of the distance to be measured the stop-watch is set into operation, then arrested at the finish, and finally returned to zero.

6. A speed-indicator for vehicles comprising a part driven relatively to the speed of the vehicle, indicating devices associated therewith showing a definite distance traversed, an electromagnet, a source of electrical energy by which it is energized, its circuit connections controlled by the movement of said driven part, and a stop-watch or timepiece controlled by the electromagnet, whereby the stop-watch is set into operation at the start of the distance to be measured, arrested at the finish, and returned to zero.

In testimony whereof I have hereunto subscribed my name.

ALDEN L. McMURTRY.

Witnesses:
 KATHARINE MACMAHON,
 WILLIAM R. STAHLIN.